No. 673,024. Patented Apr. 30, 1901.
J. LANZ.
METHOD OF FORMING METAL ARTICLES AT A SINGLE HEAT.
(Application filed June 12, 1900.)
(No Model.)
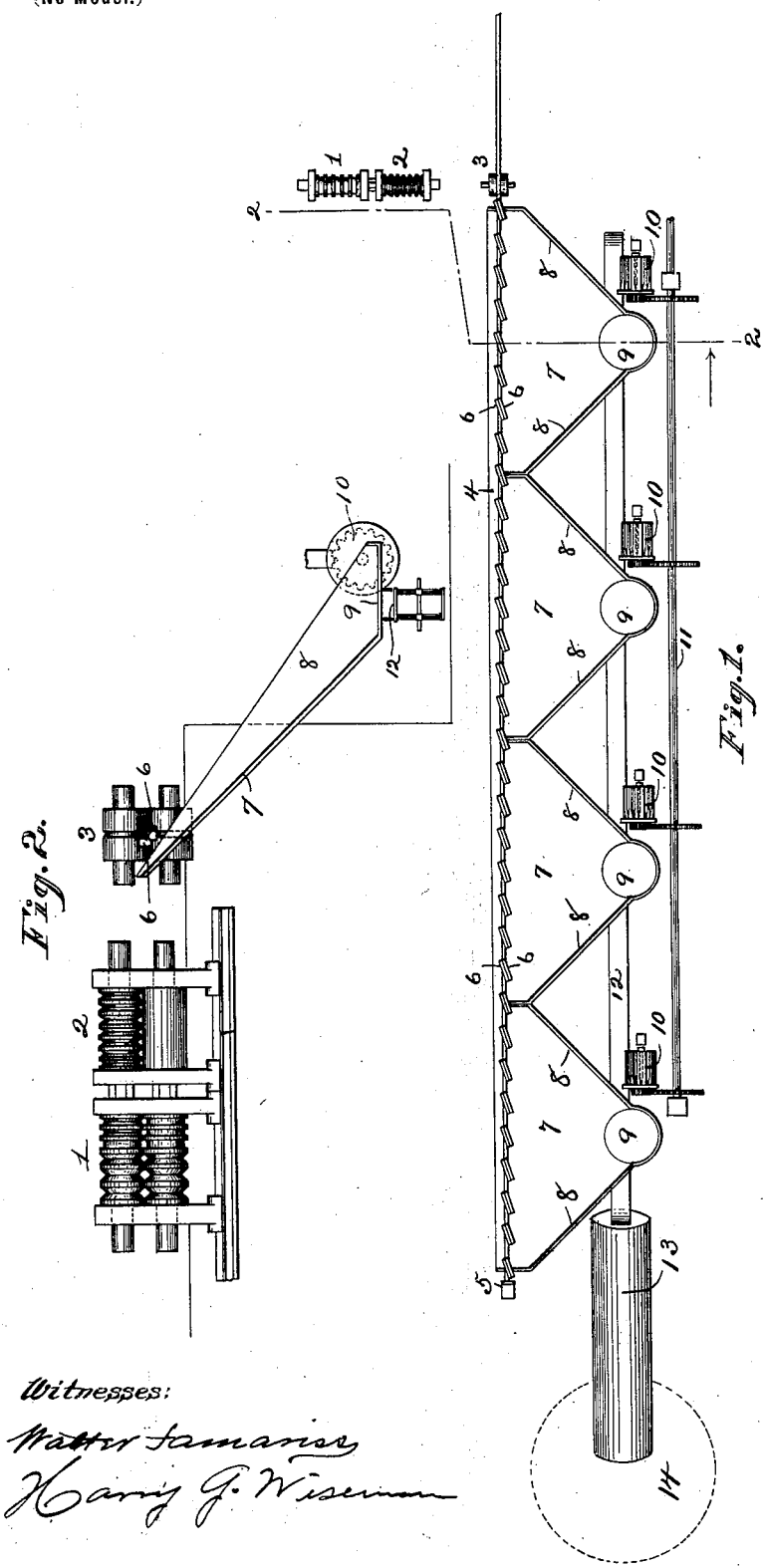
Witnesses:
Inventor:

UNITED STATES PATENT OFFICE.

JOHN LANZ, OF PITTSBURG, PENNSYLVANIA.

METHOD OF FORMING METAL ARTICLES AT A SINGLE HEAT.

SPECIFICATION forming part of Letters Patent No. 673,024, dated April 30, 1901.

Application filed June 12, 1900. Serial No. 20,020. (No specimens.)

*To all whom it may concern:*

Be it known that I, JOHN LANZ, a resident of Pittsburg, in the county of Allegheny and State of Pennsylvania, have invented a new and useful Improvement in Methods of Forming Metal Articles at a Single Heat; and I do hereby declare the following to be a full, clear, and exact description thereof.

My invention relates to a method of forming metal articles—such as harrow-teeth, spikes, bolts, rivets, pole-steps, fish-plates, &c.—and has for its object the forming of articles of this character from a heated bloom or billet at a single heat, thereby forming them expeditiously and of homogeneous composition. At present articles of this kind are formed by rolling the bloom or billet into bars and then shearing such bars into blanks of the desired length one at a time, after which the blanks are worked cold or reheated and finished in a suitable way. In case the blank is too long to simultaneously finish both ends thereof one end of the blank is heated and partially formed and then the other end is heated and formed. For rivets, &c., a bar approximately ten feet long is heated for about one-half its length and then fed into the forming-machine, which at each revolution cuts off and forms a rivet until the heated portion is worked up into rivets, when the remaining portion of the bar is heated and formed into rivets in the same way. In each of the old methods the metal bar is cut up into blanks one at a time and then operated on or is heated one or more times before the article is entirely finished, thereby necessitating a large number of furnaces and also numerous handlings of the bars and blanks. Such delay is caused as to make it impracticable to work up the product from a modern mill into the finished articles named above at a single heat.

The object of my invention is to overcome these defects; and to this end it consists in a method of forming articles of this character wherein the heated billet or bloom is reduced in proper rolls to bars having the desired cross-section and then sheared into blanks substantially simultaneously and the blanks distributed to finishing-machines, wherein the articles are shaped to the desired form, all at a single heat and without necessitating the reheating of the bars or blanks at any stage.

To enable others skilled in the art to practice my invention, I will describe the same more fully, referring to the accompanying drawings, in which—

Figure 1 is a diagrammatic plan view of apparatus suitable for carrying out my method; and Fig. 2 is a cross-section on the line 2 2, Fig. 1.

The heated billet or bloom is taken from any suitable heating-furnace or as it comes from the ingot and is broken down in the roughing-rolls 1 and finished in the finishing-rolls 2, the latter being provided with passes of the desired contour to give to the bar the desired cross-section. While still hot the finished bar is preferably moved sidewise and the end inserted into the bite of feeding-rolls 3, whereby the bar is fed over the shear-table 4 to a point 5 and is then sheared into blanks by means of the shear-blades 6 6. As shown on the drawings, thirty-three pairs of shear-blades are disclosed, and for ordinary work these are sufficient to shear the entire length of the bar into blanks, although it is entirely feasible to have a lesser number of shear-blades and shear only a portion of the bar at a single operation of the shears and then move the remainder of the bar forward again for another shearing operation. In such a case the feed-rollers 3 would need to be intermittently driven; but as the same forms no part of my invention I have not deemed it necessary to disclose the same.

From the shear-blades 6 6 inclined tables 7, having converging sides 8, lead to pans 9, so that the blanks on leaving the shear-tables will slide by gravity down the tables into the pans. I have preferably shown an inclined table for each eight pairs of shears; but obviously this can be modified as desired and other means may be used to convey or deliver the blanks to the pans. Adjacent each of the pans 9 is placed a suitable forging or shaping machine 10, which is shown merely diagrammatically in the drawings, as it forms no part of my invention. The drawings also show all of the machines driven from a single countershaft 11, but this obviously might be modified as desired. The blanks are still white or red hot when they reach the pan 9 and are taken by an attendant and fed separately to the forging-machines 10, wherein they are given the desired shape. The forging-machines disclosed in the drawings have a rotary lower die, so that the blank after being formed is, by the rotation of the die, discharged upon the belt, apron, or other suitable conveyer 12, by which it is carried into the tumbler-barrel 13, wherein it is suitably finished and discharged upon the floor-space 14. The article during its travel on the belt or apron 12 is cooled sufficiently to be finished in the tumbling-barrel 13. Some articles do not require to be tumbled, and therefore in such case the articles are delivered to other points, as desired.

By the method above described it is possible to make articles of the character specified directly from the billet or bloom without any other reheating thereof, besides not injuring the fiber of the metal, as is done in finishing articles cold, and also permitting the use of steel of higher tensile strength than is used at present in some articles. The cost of reheating and repeated handlings of the article is entirely avoided, so that the articles mentioned can be made at a much less cost than by the old methods.

What I claim, and desire to secure by Letters Patent, is—

1. The method of forming metal articles at a single heat, which consists in taking a heated billet or bloom, reducing the same to a bar, shearing the bar into blanks for a single article and then distributing the sheared blanks while still hot to suitable machines for further operating on the blank.

2. The method of forming metal articles at a single heat, which consists in taking a heated billet or bloom, reducing the same to a bar, shearing two or more blanks from the bar simultaneously and then distributing the sheared blanks while still hot to suitable machines for operating on the blanks.

3. The method of forming metal articles at a single heat, which consists in taking a heated billet or bloom, reducing the same to a bar having the desired cross-section, shearing the bar into several blanks at a time and at the same heat shaping the blanks into the desired article.

4. The method of forming metal articles at a single heat, which consists in taking a heated billet or bloom, reducing the same to a bar, shearing the bar into blanks, distributing the blanks and during a white or red heat shaping the blanks into the desired form.

5. The method of forming metal articles at a single heat, which consists in taking a heated billet or bloom, reducing the same to a bar having the desired cross-section, shearing the bar simultaneously into blanks for a single article, and at the same heat shaping the blanks into the desired article.

6. The method of forming metal articles from a single heat, which consists in taking a heated billet or bloom, reducing the same to a bar, shearing the bar into blanks for a single article, and then while still white or red hot shaping some or all of the blanks into the desired article.

In testimony whereof I, the said JOHN LANZ, have hereunto set my hand.

JOHN LANZ.

Witnesses:
F. W. WINTER,
ROBERT C. TOTTEN.